(12) United States Patent
Cherubin

(10) Patent No.: US 8,621,861 B2
(45) Date of Patent: Jan. 7, 2014

(54) ACTUATING ARMATURE

(75) Inventor: Frank Cherubin, Bad Urach (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 975 days.

(21) Appl. No.: 12/280,384

(22) PCT Filed: Dec. 22, 2006

(86) PCT No.: PCT/EP2006/012491
§ 371 (c)(1),
(2), (4) Date: Aug. 22, 2008

(87) PCT Pub. No.: WO2007/076982
PCT Pub. Date: Jul. 12, 2007

(65) Prior Publication Data
US 2008/0314712 A1    Dec. 25, 2008

(30) Foreign Application Priority Data

Dec. 22, 2005   (DE) .................. 10 2005 062 062

(51) Int. Cl.
*F15B 7/08*   (2006.01)
(52) U.S. Cl.
USPC .......................................... 60/589
(58) Field of Classification Search
USPC .......................................... 60/589
See application file for complete search history.

(56) References Cited

U.S. PATENT DOCUMENTS

| | | | | |
|---|---|---|---|---|
| 2,020,465 | A | * 11/1935 | Hall | ................................ 60/589 |
| 2,148,232 | A | * 2/1939 | Bowen | ........................... 60/589 |
| 4,566,277 | A | 1/1986 | Birkenbach | |
| 5,473,896 | A | 12/1995 | Bergelin et al. | |
| 5,950,722 | A | 9/1999 | Huetteman | |
| 6,003,639 | A | 12/1999 | Buckley et al. | |
| 6,318,514 | B1 | 11/2001 | Hinkens et al. | |
| 6,370,877 | B1 | 4/2002 | Lin | |
| 6,769,254 | B2 | 8/2004 | Heller et al. | ..................... 60/588 |
| 6,871,729 | B2 | 3/2005 | Huster et al. | ..................... 60/594 |
| 6,957,534 | B2 | 10/2005 | Lumpkin | ........................ 60/588 |
| 6,973,784 | B2 | 12/2005 | Okuma | ........................... 60/588 |
| 7,197,875 | B2 | 4/2007 | Henifin | |
| 7,219,495 | B2 | 5/2007 | Ludsteck et al. | ................ 60/588 |
| 2008/0302101 | A1 | 12/2008 | Dunlap, III | .................... 60/594 |
| 2009/0205330 | A1 | 8/2009 | Dunlap, III | |

FOREIGN PATENT DOCUMENTS

| | | |
|---|---|---|
| CN | 2698663 Y | 5/2011 |
| DE | 876 956 | 5/1953 |
| DE | 34 36 327 A1 | 4/1986 |
| DE | 42 32 766 A1 | 3/1994 |
| DE | 201 07 599 U1 | 12/2001 |
| DE | 101 13 333 A1 | 9/2002 |
| EP | 0 702 760 B1 | 10/1999 |
| EP | 1 007 404 B1 | 10/2004 |
| GB | 549464 | 11/1942 |
| GB | 879758 | 10/1961 |
| GB | 2 141 4981 A | 12/1984 |

* cited by examiner

*Primary Examiner* — F. Daniel Lopez

(74) *Attorney, Agent, or Firm* — Alan Kamrath; Kamrath IP Lawfirm, P.A.

(57) ABSTRACT

An actuating armature, in particular a brake and/or clutch armature, has a housing (2) in which is arranged a piston (5) moveable in a cylinder space (3) by an actuating element (7) in order to displace liquid. An equalizing space and/or storage tank (19) is arranged within the cylinder space (3) and/or within the piston (5).

18 Claims, 4 Drawing Sheets

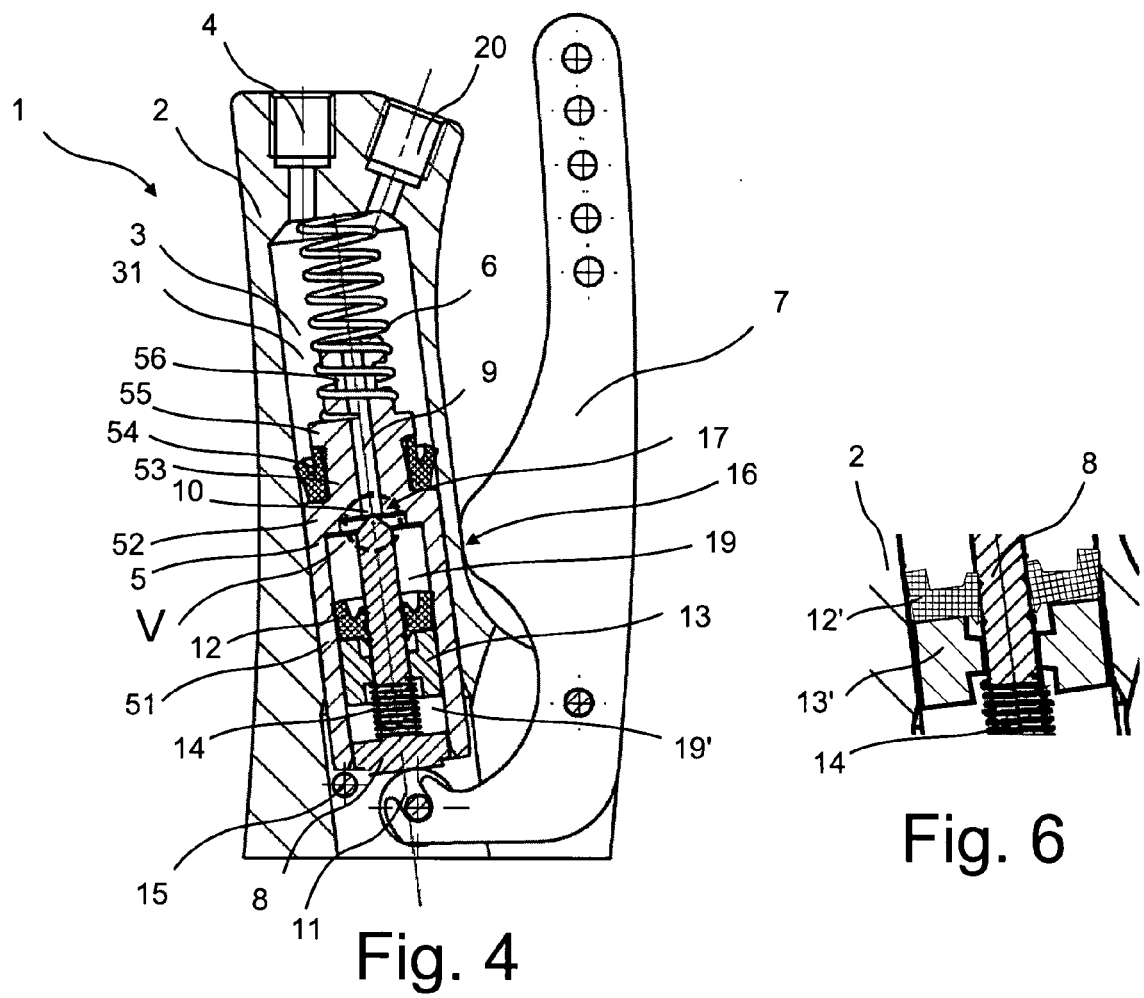
Fig. 4
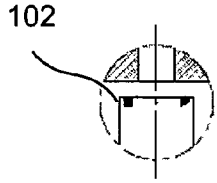
Fig. 6
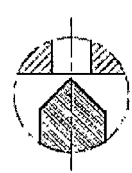 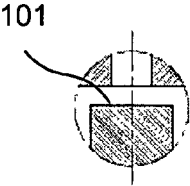
Fig. 5  Fig. 5a  Fig. 5b
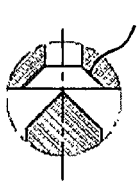 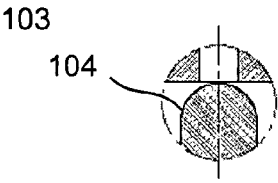 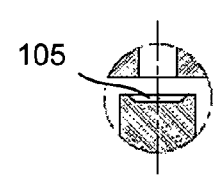
Fig. 5c  Fig. 5d  Fig. 5e

ACTUATING ARMATURE

The invention relates to an actuating fitting and, in particular, to a brake, clutch and/or door lock actuating fitting.

Such fittings are used, in particular, on single-track or multi-track vehicles as manual actuating elements fixed to the steering wheel or as foot actuating elements fixed in the foot space, for braking or engaging the clutch. Other applications, for example as an actuating element for triggering and actuating braking in model vehicles, are also conceivable.

DE 196 01 249 C2 describes an actuating fitting having a so-called expansion port which, in the unactuated state, establishes a connection between the pressure chamber and the storage container and through which volumes can be equalized.

EP 0 607 370 B2 discloses an actuating fitting having a so-called central valve which is positioned in the piston and, in the unactuated state, is opened via a positioned fixed stop. This results in a connection between the pressure chamber and the storage container and through which volumes can be equalized.

A disadvantage of the above constructions is that they have in each case large dimensions owing to the storage container, and these storage containers require additional elements, such as covers, seals, etc.

It is, therefore, in particular, the object to provide an actuating fitting of the type mentioned at the outset which is compact and can be produced economically with fewer parts.

According to embodiments of the invention, the actuating fitting, which in particular is formed as a brake and/or clutch fitting and/or door lock actuating fitting, has a housing in which is arranged a piston moveable in a cylinder space by an actuating element for displacing fluid. An equalizing space and/or storage container is arranged within the cylinder space and/or within the piston.

According to embodiments of the invention, the actuating fitting, which in particular is formed as a brake and/or clutch fitting and/or door lock actuating fitting, has a housing in which is arranged a piston moveable in a cylinder space by an actuating element for displacing fluid. A spring element is provided which subjects a transmission element bounding an equalizing space to prestress. As a result, the system can be arranged in any desired orientation, because the continued flow of the fluid from the equalizing space into the system can not be effected by the air pressure but by the spring force. An equalizing space and/or storage container can preferably also be arranged within the cylinder space and/or within the piston.

According to the invention, the piston may have an equalizing space section which substantially comprises a cylindrical wall. The equalizing space can thus preferably be arranged in the equalizing space section. Alternatively or additionally, the equalizing space may be defined substantially by the inner wall of the equalizing space section of the piston and a transmission element.

According to the invention, a valve device can be arranged within the piston.

According to the invention, the piston can be arranged in the cylinder space between a pressure space and the equalizing space and/or the storage container.

According to the invention, a passage, which has a valve device and connects the pressure space to the equalizing space and/or storage container in a closable manner, may be formed in the piston. On actuation of the actuating fitting, the valve device can close, and the actuating force can then be applied to the piston. Furthermore, the valve device may have a valve needle and a valve seat formed at the passage.

According to the invention, the piston may have a cavity functioning as an equalizing space and/or storage container and present on the side facing away from the cylinder space.

According to the invention, the equalizing space may be separable from the cylinder space functioning as the pressure space.

According to the invention, the piston may have a bore which can preferably be closed by a valve on actuation of the piston and results in separation of the equalizing space from the cylinder space functioning as the pressure space.

According to the invention, a force can be applied to one side of the valve. It is necessary for the valve to cover a small distance before the other side forms a valve seat with the bore of the piston and closes the bore, and the now interlocking connection transmitting the induced force to the piston on further induction of force. Thus, a desired displacement movement in the pressure space can be effected by said piston. The small distance covered by the valve may be in a range between 0.1 mm and 5 mm, preferably between 0.2 mm and 3 mm, more preferably between 0.3 mm and 2 mm, and preferably about 1 mm.

According to the invention, the actuating element may be in the form of a lever or thrust rod.

According to the invention, that end of the valve which realizes a valve seat with the bore may be of conical shape, with the other end thereof being formed for force induction with a surface to which the force to be applied to the valve can be transmitted from the actuating element by a transmission element in the form of a roller.

According to the invention, a sealing element bounding the equalizing space on the outside can be arranged in a moveable manner on the valve. The sealing element is supported on the side facing away from the equalizing space against a spring element, and the equalizing space is variable and/or automatically adaptable to the fluid volume to be held. A transmission element may be arranged between the sealing element and the spring element. This may protect the sealing element from tilting and damage.

According to the invention, it is possible to achieve the advantage that, regardless of the position of the sealing element in the equalizing space, the same volume is always displaceable in the pressure space on application of force to the piston, with the pressure point of the hydraulic system thus remaining unchanged.

According to the invention, a movement of the valve out of the valve seat can be realized in the unactuated position by the spring element, with the valve being capable of being opened either by the spring element and/or the fluid pressure prevailing in the system. A volume increase resulting from heating of the hydraulic fluid can flow via the valve into the equalizing space. According to the design of the spring element, the sealing element can be pushed back, and the equalizing space can be filled.

According to the invention, the piston may be hindered by a fixed stop from moving out of the housing and/or movement of the valve out of the valve seat may be limited in its distance by components for force induction, in particular, the transmission element and actuating element, and/or this limitation may be realizable by a stop for the actuating element on the housing.

According to the invention, it may be possible for the valve to execute a small distance further in the restoring direction relative to the piston, with the valve being opened until the valve is also limited in its travel by a stop.

The abovementioned object is achieved according to the invention, in particular, in that the equalizing space and/or storage container is arranged within the cylinder bore or within the cylinder space. In addition, all components for separating the equalizing space or storage space and for holding an equalizing volume are positioned within the cylinder bore. This equalizing volume can be closed on actuation of the piston. What is advantageous about this design according to the invention is that a compact arrangement of the equalizing space and/or of the storage container in a perpendicularly arranged cylinder space can be realized.

Another advantage is that, in some embodiments of the invention, independent venting can be effected at the highest point of the system if the storage container is oriented upward. There is then no need to provide a venting point. In other embodiments, air can be removed in a very service-friendly manner even by unpracticed persons if a venting point is provided at the top for venting. Positioning of the storage container upward in order to permit venting can then be dispensed with. The abovementioned service friendliness is also true regarding the fillability. Another advantage is that the hydraulic exit through which the displaced fluid volume can be passed to the actuator or actuators, for example, a clutch or brake slave cylinder (brake caliper), can be positioned in the upper region.

It should be mentioned in particular that the inaccessibility of sensitive components leads to a desired security against manipulation.

A further advantage of the actuating fitting designed according to the invention is that pressure impacts cannot lead to damage to any component.

An advantage of the design according to the invention is the realization of an automatic volume equalization in a hydraulic system as a result of temperature variations, and which does not have the disadvantages of known designs and, on the other hand, realizes the necessary functions and, moreover, has convenience features. Particularly when such a hydraulic system is used on model vehicles, extreme compactness, as permitted by the invention, is required in order to be able to realize scaled components corresponding to the original. However, the system according to the invention is not limited to this application. Any hydraulic actuating system can be equipped according to the invention therewith, whether in the form of a brake system, clutch actuating system, or system with self-adjusting or non-self-adjusting piston.

The abovementioned automatic volume equalization as a result of technical heating of the hydraulic fluid can be effected within specified limits in order to keep the pressure point stable in an advantageous manner. Furthermore, the extremely small and compact design of the construction according to the invention is worthy of mention, and, in particular, with the external shape symmetry achieved being of importance here.

What is significant is that, for the operation of the master cylinder according to the invention, a force can be applied by a lever or a thrust rod to one side of the valve advantageously designed as a valve needle, with it being necessary for the valve needle to cover an advantageously small distance before the other advantageously conical side forms a valve seat with the central bore of the piston.

The features described above can be provided individually but also in combination on an actuating fitting according to the invention in order to further reduce the total number of components.

The actuating fitting according to the invention can be used in particular on motorcycles but also on all other types of vehicles in which lever-actuated hydraulic systems are present, for example on model vehicles, bicycles or vehicles for the disabled.

Further fields of use for the invention comprise, for example, the actuation of doors. Owing to the small overall size, the actuating fitting according to the invention can be used for transmitting the movement of a door handle to the door lock of a vehicle door.

Working examples of an actuating fitting according to the invention are explained in more detail below with reference to the drawings.

FIG. 4 shows a view, corresponding to FIG. 1, of the embodiment of FIG. 1, with more fluid having been introduced into the equalizing container.

FIG. 5 shows a section of FIG. 4 in the circle V.

FIG. 5a shows a view, corresponding to FIG. 5, of a variant of the embodiment of FIG. 1.

FIG. 5b shows a view, corresponding to FIG. 5, of a further variant of the embodiment of FIG. 1.

FIG. 5c shows a view, corresponding to FIG. 5, of a further variant of the embodiment of FIG. 1.

FIG. 5d shows a view, corresponding to FIG. 5, of a further variant of the embodiment of FIG. 1.

FIG. 5e shows a view, corresponding to FIG. 5, of a further variant of the embodiment of FIG. 1.

FIG. 6 shows a section of FIG. 4 for explaining a variant of the embodiment of FIG. 1.

Figure 1:
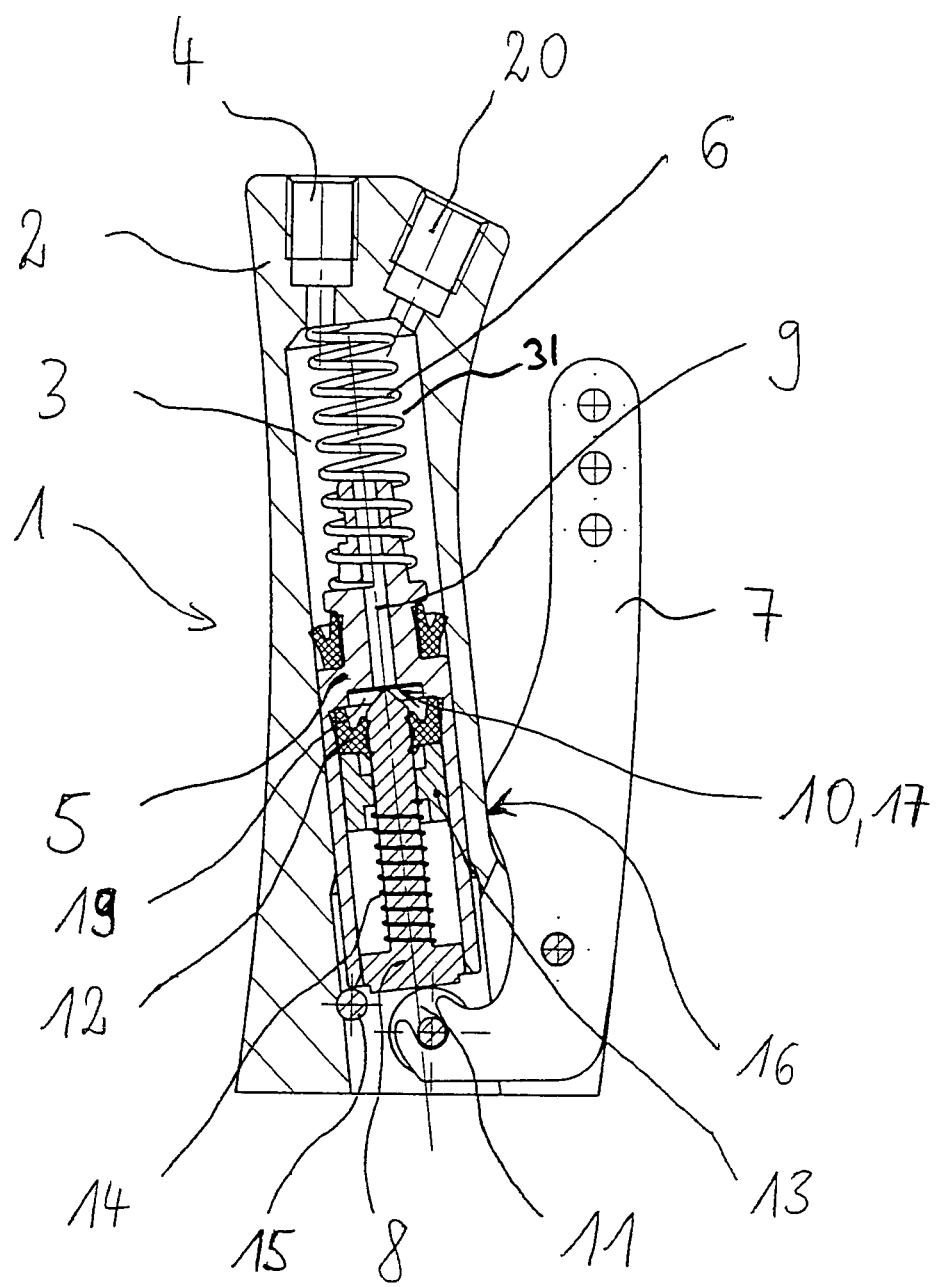
FIG. 1 shows a sectional diagram of an actuating fitting according to the invention.

Inter alia, the following reference numerals are used in the following description of the working examples:

1 Actuating fitting
2 Housing
3 Cylindrical bore/cylinder space
31 Pressure chamber
4 Exit
5 Piston
51 Equalizing space section
52 Valve section
53 Sealing groove section
54 Sealing element
55 Projection
56 Extension
6 Spring element
7 Actuating element
8 Valve
9 Bore
10 Valve seat
11 Transmission element
12, 12' Sealing element
13, 13' Transmission element
14 Spring element
15 Stop
16 Stop
17 Valve
18 Actuator
19 Equalizing space, storage container
19' Equalizing space
20 Vent bore
101 Blunt valve needle head
102 Sealing element
103 Bevel
104 Convex valve needle head
105 Depression
W Distance FIG. 1 shows an actuating fitting 1 which consists of a housing 2 having a substantially cylindrical bore 3 for holding further elements. Advantageously, the bore 3 serving as a cylinder space is virtually perpendicular in order to permit mounting of a vent bore 20 at the highest point, via which vent bore venting of undesired air can be effected, for example, by a valve which is not shown. A hydraulic exit 4 through which the displaced fluid volume is passed to at least one actuator 18 is positioned in the upper region (cf. FIG. 2).

The piston 5 displacing the fluid on actuation of the actuating fitting 1 is positioned in the cylinder space 3. Preferably, the piston 5 is prestressed by a spring element 6 designed as a pressure spring, and can execute a stroke established by the design if a force is applied via further elements described below, for example by an actuating element 7. The actuating element 7 is preferably designed as a lever or as a thrust rod.

A valve 8 preferably designed as a valve needle is positioned in a space 19 present in the piston 5, with the space 19 being on the side facing away from the pressure chamber 31. A preferably conical end of this valve needle 8 realizes a valve seat 10 in correspondence with a central bore 9 of the piston 5, with the other end thereof being designed so that a force can be introduced. Preferably, this end is in the form of a surface to which a transmission element 11 in the form of a roller transmits the force to be applied to the valve needle 8 from a lever 7.

The cylindrical tubular space 19 formed by the outer casing of the valve needle 8 and the inner casing of the piston 5 serves as a holding space for the equalization volume, with said equalization volume being closed off from the outside by a preferably spring-prestressed sealing element 12. Preferably, a transmission element 13 is arranged between the sealing element 12 and a spring element 14 in the form of a pressure spring, in order to protect the sealing element 12 from tilting and damage.

The piston 5 is prevented from traveling out of the housing 2 by a fixed stop 15. The design is such that, in spite of the attached piston 5, the valve needle 8 can execute a movement out of the valve seat 10 before being limited in its travel by the components for force induction, i.e. the transmission element 11 and actuating element 7. In addition, this limitation can be realized by the stop 16 of the lever 7 on the housing 2.

Figure 3:
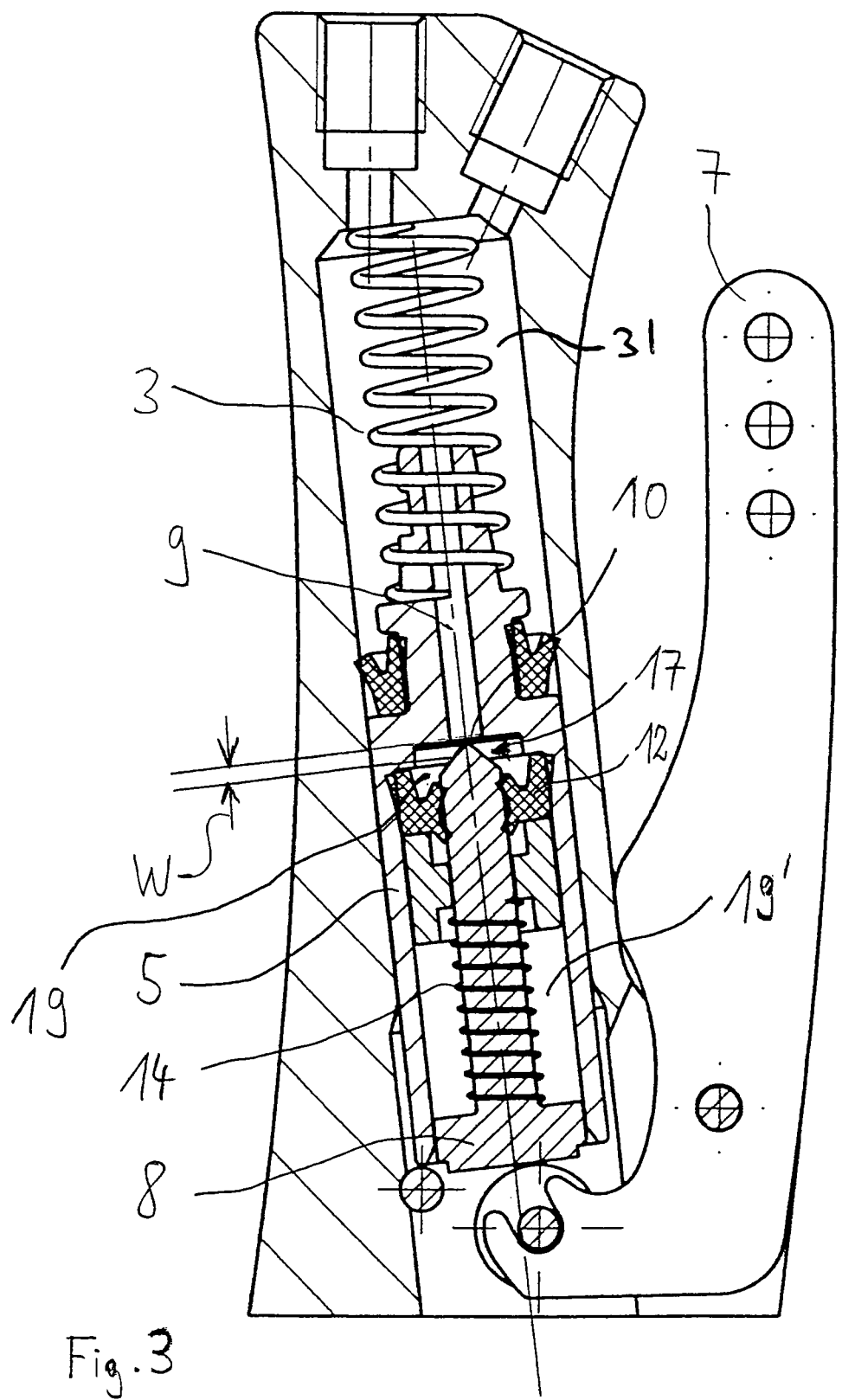
FIG. 3 shows an enlarged diagram of FIG. 1.

A force is applied by the lever 7 to that side of the valve needle 8 which is preferably in the form of a surface. As a result, this travels a preferably small distance W before the other conical side forms a valve seat 10 with the central bore 9 of the piston 5 (cf. FIG. 3). This valve seat 10 hydraulically seals the space 19 serving as an equalizing space from that region of the cylinder space 3 which functions as pressure chamber 31 and, hence, forms a valve 17. The now interlocking connection transmits the induced force to the piston 5, and the latter executes the desired displacement movement in the pressure chamber 31. After reduction of the induced force, the piston 5, supported by the pressure spring 6 preferably present, moves back to its rest position, which is determined by the fixed stop 15. The valve needle 8 can travel a preferably small distance further in the restoration direction relative to the piston 5 so that the valve 17 is opened until the valve needle 8, too, is limited in its travel by a stop 16.

A volume increase resulting from heating the hydraulic fluid can pass through the open valve 17 and, according to the design of the pressure spring 14 positioned on the valve needle 8, will push back the sealing element 12 at a preferably low fluid pressure and will fill the equalizing space 19. The sealing element 12 is pushed back into the equalizing space designated by 19' and, thus, increases the size of the equalizing space 19 holding the fluid (cf. FIG. 3).

When the hydraulic fluid cools, this process is reversed.

Regardless of the position of the sealing element 12 in the equalizing space 19, the same volume can always be displaced in the pressure chamber 31 on application of force. The pressure point of a hydraulic system thus remains unchanged.

Figure 2:
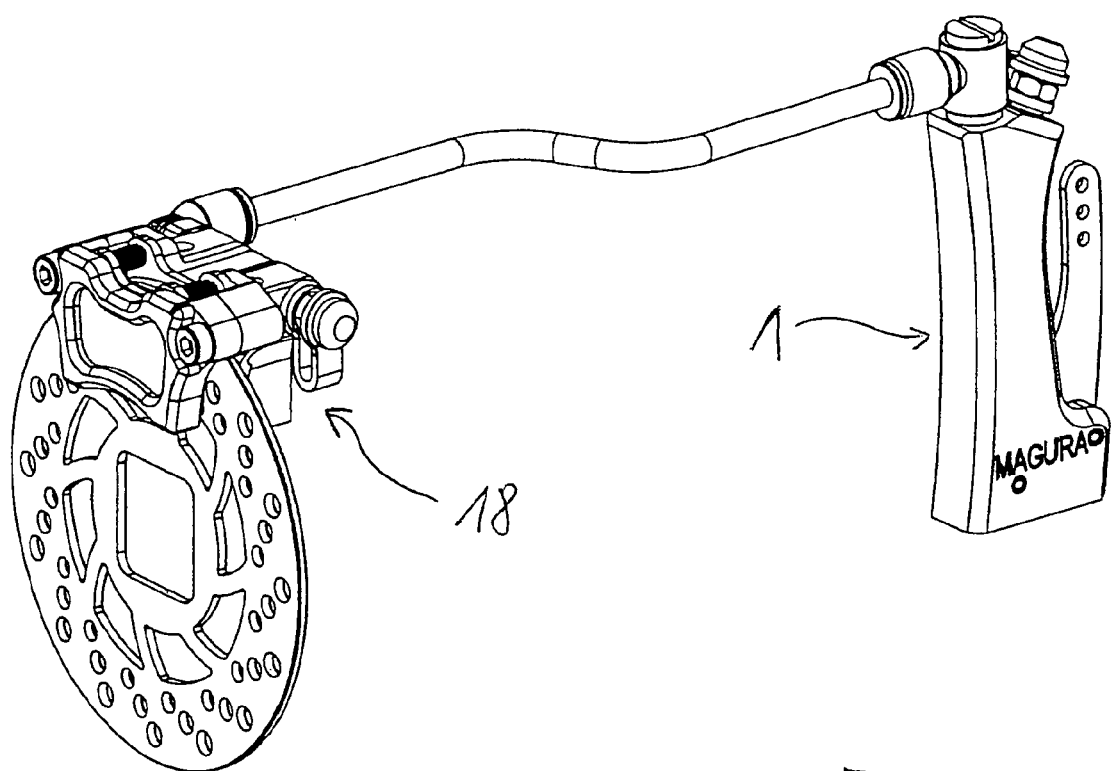
FIG. 2 shows an actuating fitting according to FIG. 1 with an actuator connected thereto.

FIG. 4 shows a view, corresponding to FIG. 1, of the embodiment of FIG. 1, but with more fluid being introduced into the system, and with the result that the size of the equalizing space 19 increases. For this purpose, the sealing element 12 in the piston 5 in FIG. 4 is pushed downward against the force of the spring element 14. The volume of the equalizing space 19' is correspondingly smaller. Owing to the larger equalizing space 19 filled with fluid, it is possible to equalize the wear of the lining if, for example, a brake caliper, as shown in FIG. 2, is connected as a slave to the actuating fitting 1.

In the embodiment shown in FIG. 4 (and FIG. 1), the piston 5 has an equalizing space section 51 which has substantially a cylindrical wall which encloses the equalizing space 19 and the equalizing space 19'. The transmission element 13 is displaceably arranged in the equalizing space section 51. If more liquid has to be held in the equalizing space 19 (e.g. temperature equalization), the transmission element 13 moves against the force of the spring element 14 in the direction of the equalizing space 19', with the air (or gas) present there being compressed or being displaced outward. If, conversely, fluid is to be introduced from the equalizing space 19, the transmission element 13 moves in the direction of the force of the spring element 14 toward the equalizing space 19.

By applying a spring element 14 to the transmission element 13, it is possible to install the actuating fitting according to requirements in any desired orientation. As a result, good adaptation to the installation space available in the respective application can be effected.

If self-venting is desired, it is possible to orient the actuating fitting in such a way that the equalizing space 19 is arranged at the top so that any air present in the system can collect in the equalizing space. To enable self-venting to take place, a region of the equalizing space should be above the valve opening, based on gravitational force, so that air which does not enter the system again during volume equalization can collect therein.

The piston 5 is provided with a valve section 52 in which the valve seat 10 is arranged so that the bore 9 (passage) can close as described above.

The piston 5 furthermore has a sealing groove section 53 in which a sealing element 54 for sealing against the inner wall of the cylinder space 3 is provided. The sealing groove section 53 is terminated by a projection 55 which is joined to an extension 56 on which the spring element 6 is arranged. The bore 9 extends from the valve section 52 through the sealing groove section 53 and the extension 56 to the pressure chamber 31. Alternatively, the bore 9 could extend, for example, at the end of the sealing section also or only laterally relative to the pressure chamber 31.

FIG. 5 shows a section of FIG. 4 in the circle V. FIGS. 5a to 5e show views, corresponding to FIG. 5 of variants of the embodiment of FIG. 1. FIG. 5a shows a blunt valve needle head 101. FIG. 5b shows a blunt valve needle head in which a sealing element 102 which extends around the valve opening is arranged. FIG. 5c shows a valve opening having a bevel 103. FIG. 5d shows a convex valve needle head 104. FIG. 5e shows a blunt valve needle head having a depression 105 in the valve needle head surface. The other elements correspond in each case to the embodiment shown in FIG. 1, the description of which is referred to.

FIG. 6 shows a section of FIG. 4 for explaining a variant of the embodiment of FIG. 1. Only the differences are described, and, otherwise, reference is made to the above description. The piston 5 has no equalizing space section. Instead, the transmission element 13' and the sealing element 12' have a correspondingly larger diameter. The equalizing space 19 is, thus, defined by the inner wall of the cylinder space 3, the piston 5 and the transmission element 13' or the sealing element 12'.

The invention claimed is:

1. An actuating fitting comprising: a housing in which is arranged a piston, wherein the piston is moveable in a cylinder space by an actuating element for displacing fluid; an equalizing space arranged within the cylinder space, wherein the piston is arranged in the cylinder space between a pressure space and the equalizing space; and a passage having a valve device and connecting in a closeable manner the pressure space to the equalizing space, in which the valve device is formed in such a way that, on actuation of the actuating element, the valve device closes and an actuating force is then applied to the piston, wherein the equalizing space does not communicate with the pressure space when the actuating force is applied to the piston by the actuating element, wherein the piston has an equalizing space section which substantially comprises a cylindrical wall and in which the equalizing space is arranged in the equalizing space section.

2. The actuating fitting according to claim 1, further comprising: a sealing element closing off the equalizing space from outside.

3. The actuating fitting according to claim 1, further comprising a spring element which subjects a transmission element bounding the equalizing space to prestress.

4. The actuating fitting according to claim 1, in which the equalizing space is substantially defined by an inner wall of the equalizing space section of the piston and a transmission element.

5. The actuating fitting according to claim 1, wherein the valve device is arranged within the piston.

6. The actuating fitting according to claim 1, in which the valve device has a valve needle and has a valve seat formed at the passage.

7. The actuating fitting according to claim 1, in which the piston has a cavity functioning as the equalizing space and present on a side facing away from the pressure space.

8. The actuating fitting according to claim 1, in which when the actuating force is applied to one side of the valve device, the valve device covers a small distance before another side of the valve forms a valve seat with the passage and closes the passage, and on further introduction of the actuating force, the actuating force is introduced to the piston so that a desired displacement movement in the pressure space is effected by said piston.

9. The actuating fitting according to claim 8, in which the distance covered by the valve is in the range between 0.1 mm and 5 mm [millimeters].

10. The actuating fitting according to claim 8, in which the other side of the valve which forms the valve seat with the passage is conical, with the side thereof being formed, for introduction of the actuating force, with a surface to which the actuating force to be applied to the valve device is transmitted by a transmission element in the form of a roller from the actuating element.

11. The actuating fitting according to claim 1, in which the actuating element is in the form of a lever or thrust rod.

12. An actuating fitting comprising: a housing in which is arranged a piston, wherein the piston is moveable in a cylinder space by an actuating element for displacing fluid; an equalizing space arranged within the cylinder space, wherein the piston is arranged in the cylinder space between a pressure space and the equalizing space; a passage having a valve device and connecting in a closeable manner the pressure space to the equalizing space, in which the valve device is formed in such a way that, on actuation of the actuating element, the valve device closes and an actuating force is then applied to the piston, wherein the equalizing space does not communicate with the pressure space when the actuating force is applied to the piston by the actuating element; and a sealing element closing off the equalizing space from outside, in which the sealing element bounds the equalizing space, with the sealing element being supported on a side facing away from the equalizing space against a spring element, and the equalizing space being variable and/or automatically adaptable to a fluid volume to be held.

13. The actuating fitting according to claim 12, further comprising a transmission element arranged between the sealing element and the spring element protecting the sealing element from tilting and damage.

14. The actuating fitting according to claim 12, in which, regardless of the position of the sealing element in the equalizing space, the same volume is displaced in the pressure space on application of force to the piston, with a pressure point of a hydraulic system remaining unchanged.

15. The actuating fitting according to claim 12, in which, in an unactuated position, a movement of the valve device out of the valve seat is realized by the spring element, with the valve being opened either by the spring element and/or fluid pressure.

16. The actuating fitting according to claim 15, wherein the sealing element is pushed back against the spring element by a volume increase resulting from heating of the hydraulic fluid flows via the valve device into the equalizing space to fill the equalizing space.

17. The actuating fitting according to claim 16, in which the piston is prevented from traveling out of the housing by a fixed stop and/or the movement of the valve device from the valve seat is limited in its distance by components for introduction of the actuating force and/or by a stop for the actuating element on the housing.

18. The actuating fitting according to claim 16, in which a small distance further in movement of the valve device out of the valve seat is executed by the valve device relative to the piston, with the valve device being opened until the valve device is limited in its travel by a stop.

* * * * *